US006639908B1

(12) United States Patent
Silventoinen et al.

(10) Patent No.: US 6,639,908 B1
(45) Date of Patent: Oct. 28, 2003

(54) METHOD OF FACILITATING TRANSMISSION LEVEL MEASUREMENT, AND BASE STATION

(75) Inventors: Marko Silventoinen, Helsinki (FI); Harri Posti, Oulu (FI); Harri Jokinen, Hiisi (FI); Jari Ryynänen, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/254,928

(22) PCT Filed: Sep. 16, 1997

(86) PCT No.: PCT/FI97/00549

§ 371 (c)(1),
(2), (4) Date: Mar. 17, 1999

(87) PCT Pub. No.: WO98/12678

PCT Pub. Date: Mar. 26, 1998

(30) Foreign Application Priority Data

Sep. 18, 1996 (FI) .................................................. 963698

(51) Int. Cl.$^7$ .............................. H04J 3/00; H04B 7/00; H04Q 7/00
(52) U.S. Cl. ........................ 370/345; 370/321; 370/347; 370/331; 455/515; 455/509; 455/434
(58) Field of Search ................................. 370/321, 318, 370/330, 436, 478, 507, 522, 347, 336, 350, 355, 311, 329, 345, 331; 455/450, 504, 505, 506, 515, 524, 509, 434, 436–439, 525

(56) References Cited

U.S. PATENT DOCUMENTS

| | | | | |
|---|---|---|---|---|
| 5,020,056 A | * | 5/1991 | Chennakeshu | 370/347 |
| 5,267,261 A | | 11/1993 | Blakeney, II et al. | 455/436 |
| 5,381,443 A | * | 1/1995 | Borth et al. | 455/450 |
| 5,710,973 A | * | 1/1998 | Yamada et al. | 455/450 |
| 5,825,758 A | * | 10/1998 | Heikkinen et al. | 370/330 |
| 5,839,071 A | * | 11/1998 | Johnson | 455/440 |
| 5,983,112 A | * | 11/1999 | Kay | 455/504 |
| 5,995,498 A | * | 11/1999 | Toot, Jr. et al. | 370/332 |
| 6,137,772 A | * | 10/2000 | Turcotte et al. | 370/329 |
| 6,275,487 B1 | * | 8/2001 | Szalajski et al. | 370/347 |

FOREIGN PATENT DOCUMENTS

| | | |
|---|---|---|
| EP | 530 165 | 3/1993 |
| GB | 2 246 053 | 1/1992 |
| WO | 95/33313 | 12/1995 |

OTHER PUBLICATIONS

X. Lagrange, P. Godlewski, "Conference record/IEEE Vehicular Technology Conference 44", 1994, ., (Stockholm), p. 1050, second column, last paragraph, p. 1051, first column, last two paragraphs.

* cited by examiner

*Primary Examiner*—Duc Nguyen
(74) *Attorney, Agent, or Firm*—Pillsbury Winthrop LLP

(57) ABSTRACT

The invention relates to a method of facilitating measurement of a transmission level, and a base station. The base station moves its broadcast (BCCH) from one time slot (10 to 17) to another so that the broadcast (BCCH) is sent in different time slots (10 to 17) of successive frames. In the long run, the broadcast (BCCH) is preferably sent in all the time slots (10 to 17).

16 Claims, 2 Drawing Sheets

METHOD OF FACILITATING TRANSMISSION LEVEL MEASUREMENT, AND BASE STATION

FIELD OF INVENTION

The invention relates to a method of facilitating measurement of a transmission level, the method being used in a radio system which comprises at least one base station and terminal equipment; in which data is transmitted in a frame that comprises time slots; and in which the base station sends a broadcast that the terminal equipment uses in comparing the strength of signals received from different base stations.

The invention also relates to a method of facilitating measurement of a transmission level, the method being used in a radio system which comprises more than one base station and at least one terminal equipment; in which the transmission is modulated with a carrier; in which data is transmitted in a frame that comprises time slots; and in which more than one base station sends its own broadcast modulated with the same carrier, the broadcast being used by the terminal equipment in comparing the strength of signals received from different base stations.

The invention also relates to a base station arranged to be used in a radio system which comprises at least one base station and terminal equipment; in which data is transmitted in frames that comprise time slots; and in which the base station is arranged to send a broadcast that the terminal equipment is arranged to use in comparing the strength of signals received from different base stations.

The invention also relates to a base station that is arranged to be used in a radio system which comprises at least one base station and terminal equipment; in which the transmission is arranged to be modulated with a carrier; in which data is transmitted in frames that comprise time slots; and in which the base station is arranged to send a broadcast that the terminal equipment is arranged to use in comparing the strength of signals received from different base stations.

BACKGROUND OF INVENTION

In a typical time division radio system, such as the GSM (Global System for Mobile Communication), data is transmitted in frames each one of which comprises a predefined number of time slots. In a typical radio system, a base station continuously broadcasts a beacon signal in some time slot, so that the terminal equipments know the base station or stations in whose coverage area they are. The beacon signal can be a separate pilot signal or a broadcast on a broadcast channel. In prior art systems, a terminal equipment listens to the broadcast of its home base station, sent in the first time slot of the frame. The broadcast comprises information that is important particularly in the active mode when a traffic channel is used. From the home base station the terminal equipment obtains e.g. information on the basis of which it also listens to and measures broadcasts of adjacent cells. When the strength of the broadcast both of the home cell of the terminal equipment and of the adjacent cells are known, it is for example possible to decide which one of the base stations is the best candidate for a new base station in handover.

Particularly in base stations with low capacity and with a single transceiver, the requirement of broadcasting a continuous beacon signal prevents the use of such capacity and quality-improving characteristics as frequency hopping, discontinuous transmission, and power control. On the other hand, a broadcast sent only in the first time slot does not allow monitoring of broadcasts sent by the base stations, particularly not when the terminal equipment is in the active mode.

BRIEF DESCRIPTION OF INVENTION

The object of the present invention is to provide a method that allows continuous measurement of the transmission power of adjacent cells without a separate beacon signal.

The object is achieved by a method as described in the introduction, the method being characterized in that the base station broadcasts in different time slots of successive frames.

The method of the invention is also characterized in that each base station broadcasts in different time slots of successive frames.

The base station of the invention is characterized in that the base station is arranged to broadcast in different time slots of successive frames.

The base station of the invention is also characterized in that more than one base station is arranged to send its own broadcast, modulated with the same carrier, in different time slots of the frame, and each base station is arranged to broadcast in different time slots of successive frames.

Major advantages are achieved by the method of the invention. The invention allows continuous measurement of transmission power, as well as monitoring of broadcasts even when the terminal equipment is in the active mode. These facilities are utilized, for example, in handover.

BRIEF DESCRIPTION OF DRAWINGS

In the following the invention will be described in greater detail with reference to the examples illustrated in the attached drawings, in which.

DESCRIPTION OF PREFERRED EMBODIMENTS

The solution provided by the invention is particularly well suited for use in the GSM and DCS radio system, but it is not to be understood as being limited to them.

Figure 1:
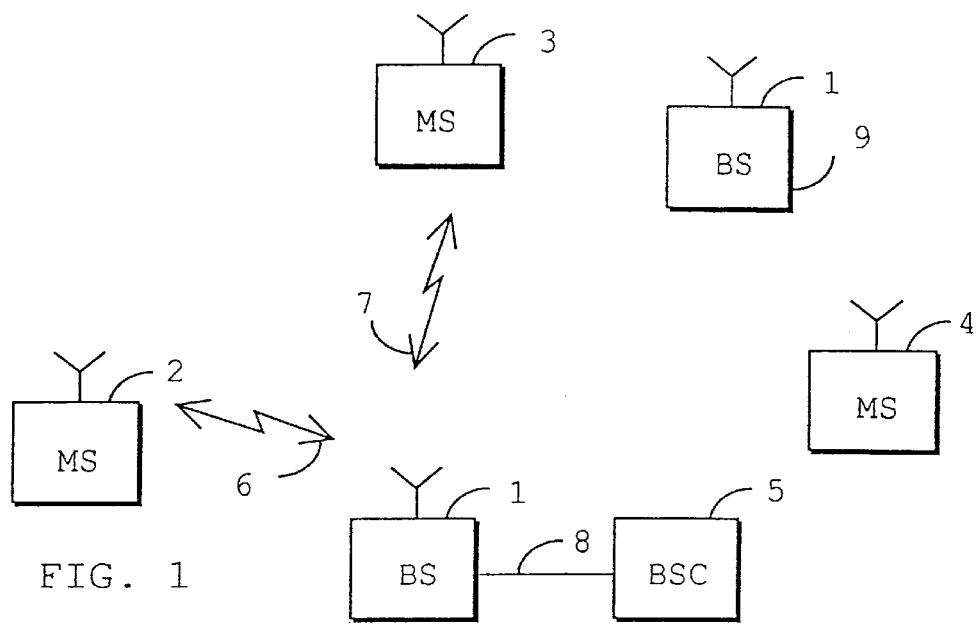
FIG. 1 shows a radio system.

FIG. 1 shows a typical digital radio system, which comprises base stations 1 and 9, terminal equipments 2 to 4, and a base station controller 5.

The base station 1 communicates with the terminal equipments 2 to 4 by signals 6 and 7. The base station 1 is connected with the base station controller 5 via a digital transmission link 8. The terminal equipment 2 to 4 is usually a mobile phone. The signals 6 and 7 between the base stations 1 and 9 and the terminal equipments 2 to 4 comprise digitized information, which is speech or data information generated by subscribers, or control information generated by the radio system.

Figure 2:
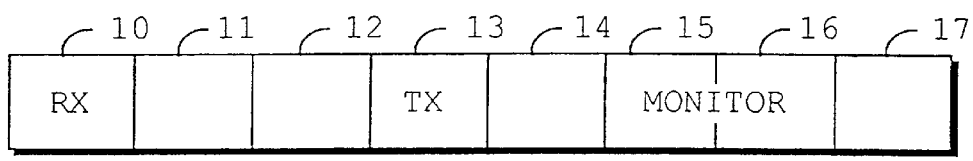
FIG. 2 shows a frame structure.

Let us now examine a method according to the invention with reference to FIGS. 2 to 5. In the GSM system, the users are separated from one another at the carrier frequencies. On a single carrier there may be at most eight users, which in turn are separated from one another in the time domain by time slots. FIG. 2 shows a typical GSM frame structure like this with eight time slots 10 to 17. If the terminal equipment receives a broadcast in time slot 10, the terminal equipment 2 to 4 transmits in time slot 13 and generally monitors base station signals in time slots 15 and 16. Since the reception instant of the terminal equipment 2 to 4 may be any one of time slots 10 to 17, the terminal equipment may also transmit and monitor in any time slot whatsoever. Because of this, in order that the subscriber terminal could use a broadcast, the broadcast has to be continuous.

Figure 3:
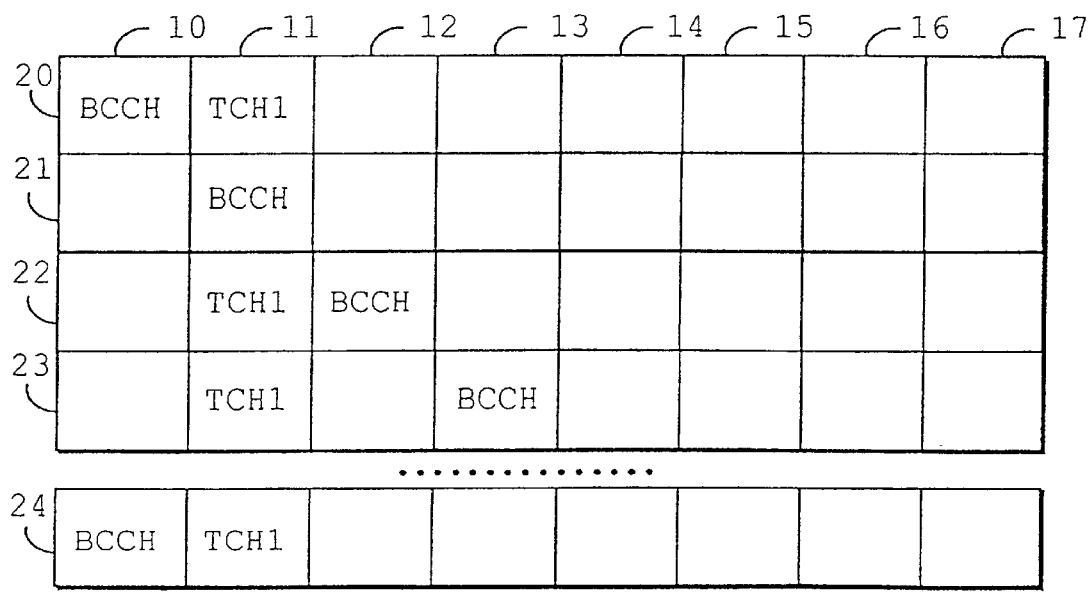
FIG. 3 illustrates frames, and moving of a broadcast in a frame structure.

The solution provided by the invention allows continuous monitoring of a broadcast so that the base station sends the broadcast in different time slots of successive frames so that in the long run the broadcast is sent in essentially all the time slots of the frame. FIG. 3 shows one such solution provided by the invention. FIG. 3 comprises time slots 10 to 17 in frames 20 to 24. In the beginning, the broadcast BCCH of frame 20 is sent in time slot 10. For the next frame 21, the broadcast BCCH is slid one frame forward to time slot 11. This is continued until frame 23, where the broadcast BCCH is in time slot 17. For frame 24, the broadcast BCCH is slid back to time slot 10. The sliding, or moving, of the broadcast BCCH is implemented by moving from the last time slot to the first time slot within the limits of the time slots contained in the frame. To make this solution possible, both speech coding and channel coding should also adapt to a new, lowered data transmission rate, which is ⅞ of the original.

Figures 4, 5, 6:
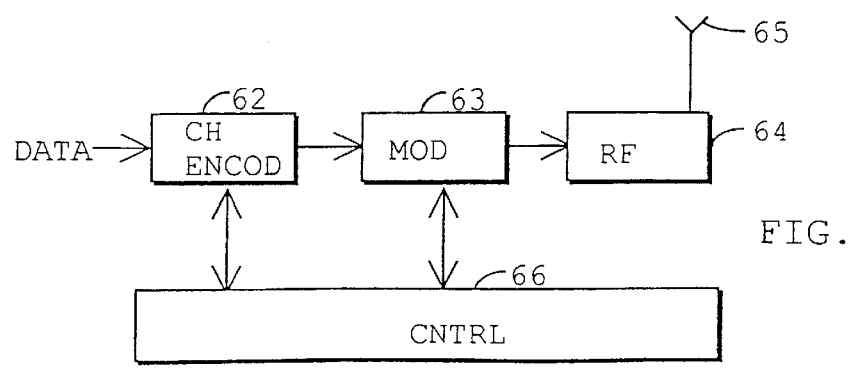
FIG. 4 illustrates frames, and moving of a broadcast in a frame structure.
FIG. 5 illustrates frames, and moving of broadcasts from several base stations in a frame structure.
FIG. 6 is a block diagram of a transmitter of a base station.

In the second solution provided by the invention, traffic transmissions TCH are also moved. This is illustrated in FIG. 4. Traffic transmissions TCH move away from the time slot in which the broadcast BCCH is sent. Preferably this happens so that the traffic transmission concerned TCH moves to a time slot that is adjacent to that of the broadcast BCCH. For example, let the time slot of the broadcast be N. The traffic transmission TCH moving away from time slot N is then sent in time slot N+1 or N−1. A particular advantage of this solution is that the speech and channel coding need not be changed. In this solution, the transmission also moves from the last time slot to the first time slot within the limits of the time slots contained in the frame.

FIG. 5 shows another solution provided by the invention. In this method, each base station 30 to 33 (not shown in the figure) sends a broadcast BCCH modulated with the same carrier to said base stations in different time slots 10 to 17, the broadcast being here indicated more specifically by BCCH30 to BCCH33. The broadcast BCCH30 to BCCH33 of different base stations is thus assigned a frequency band of its own. Since in this inventive solution the radio system is synchronized, it is possible to slide the broadcasts BCCH30 to BCCH33 from one time slot to another as the frame 20 to 24 changes. The advantage also here is that the traffic transmissions TCH need not be modified, and the speech and channel coding do not change.

In the following we shall specify the method provided by the invention. The base station broadcasts BCCH in different time slots of any two successive frames so that in the long run the broadcast is sent in all time slots of the frame structure. This means that the longer the time that has passed, the more likely it is that all the time slots of the frame structure are used.

The base station broadcasts in a predefined time slot, and more particularly, the base station preferably sends its broadcast in successive time slots of successive frames. If the broadcast in frame M is in time slot N, in the next time slot M+b the broadcast is slid to time slot N+b or N−b, where M, N and b are positive integers.

When the base station broadcasts in a certain time slot, the base station sends a traffic transmission intended for the time slot concerned in an adjacent time slot on either side of the broadcast.

In the second embodiment of the invention, more than one base station sends a broadcast, modulated with the same carrier, in different time slots of the frame, and each base station sends its broadcast in different time slots of any two successive frames. In this solution each base station also preferably broadcasts in different time slots of successive frames so that the longer the time that has passed, the more likely it is that the broadcast is sent in essentially all the time slots of the frame.

In addition to the inventive solutions illustrated in FIGS. 2 to 5, the broadcast can also be moved in the frame structure from one time slot to another in any random or predefined manner. The base station preferably notifies the terminal equipment of the moving of the broadcast and/or the way the broadcast is moved, or the moving and/or the way of moving are predefined.

FIG. 6 is a block diagram of a base station in which the method provided by the invention can be applied. The base station comprises a channel coder 62, modulator 63, radio frequency means 64, an antenna 65, and control means 66. Digital data is supplied to the channel coder 62, which adds redundancy to the data flow so that any errors caused by the channel can be better corrected in the receiver. From the channel coder 62 the signal propagates to the modulator 63, which converts the discrete stream of symbols formed by the channel coder 62 into a function, i.e. wave form, dependent on time. The wave form flow formed by the modulator 63 is modulated, according to the prior art, to a radio frequency flow with a carrier in the radio frequency means 64, after which it is filtered. A radio frequency signal is transmitted via the antenna 65. The operation of the transmitter is controlled by the control means 66, by which for example the time slots of the broadcast and the traffic transmission can be changed in accordance with the inventive method.

The solutions of the invention can be implemented for example by ASIC or VLSI circuits, particularly as regards digital signal processing. The functions performed are preferably realized by software, utilizing microprocessor technology.

Although the invention is described above with reference to the example illustrated in the attached drawings, it is to be understood that the invention is not limited thereto but can be modified in many ways within the inventive idea presented in the attached claims.

What is claimed is:

1. A method of facilitating measurement of a transmission level, the method being used in a radio system which includes at least one base station and terminal equipment, the method comprising:
   transmitting data in a frame that includes time slots; and
   broadcasting by the base station in different time slots of successive frames a broadcast that the terminal equipment uses in comparing the strength of signals received from different base stations.

2. The method of claim 1, wherein the broadcasting by each base station further comprises sending a traffic transmission intended for a certain time slot in an essentially adjacent time slot.

3. A method of facilitating measurement of a transmission level, the method being used in a radio system which includes more than one base station and at least one terminal equipment, the method comprising:

modulating the transmission with a carrier;

transmitting data in a frame that includes time slots in which more than one base station sends its own broadcast modulated with the same carrier; and broadcasting by each base station the broadcast in different time slots of successive frames, the broadcast being used by the terminal equipment in comparing the strength of signals received from different base stations.

4. The method of claim 1 or 2, wherein the broadcasting by each base station includes broadcasts in a predefined time slot.

5. The method of claim 1 or 2, wherein the broadcasting by each base station includes broadcasts in successive time slots of successive frames.

6. The method of claim 2, wherein broadcasting by each base station broadcasts in different time slots of successive frames is such that the longer the time of broadcasting, the more likely it is that the broadcast is sent in essentially all the time slots of the frame.

7. A base station that is arranged to be used in a radio system including at least one base station and terminal equipment, and in which radio system data is transmitted in frames that include time slots, wherein:

the base station is arranged to send a broadcast used by the terminal equipment comparing the strength of signals received from different base stations; and the base station is arranged to broadcast in different time slots of successive frames.

8. A base station that is arranged to be used in a radio system including at least one base station and terminal equipment, and in which radio system data is transmitted in frames that include time slots, the data transmission arranged to be modulated with a carrier, wherein:

the base station is arranged to send a broadcast used by the terminal equipment in comparing the strength of signals received from different base stations;

the base station is arranged to send its own broadcast modulated with the same carrier in different time slots of the frame; and the base station is arranged to broadcast in different time slots of successive frames.

9. The base station of claim 7 or 8, wherein the base station is further arranged to broadcast in a predefined time slot.

10. The base station of claim 7 or 8, wherein the base station is further arranged to broadcast in a predefined time slot of successive frames.

11. The base station of claim 7 or 8, wherein the base station is further arranged to broadcast a traffic transmission intended for a certain time slot in an essentially adjacent time slot.

12. The base station of claim 8, wherein the base station is further arranged to broadcast in different time slots of successive frames, using essentially all the time slots of the frame.

13. A method of facilitating measurement of a transmission level, the method for use in a radio system including base stations and terminal equipments; the method comprising: transmitting by the base stations, using the same carrier frequency in different time slots of successive frames, broadcasts that the terminal equipments use in comparing the strengths of signals received from different base stations.

14. A radio system including base stations and terminal equipments; wherein:

the base stations are configured to transmit broadcasts;

the terminal equipments are configured to use the broadcasts in comparing the strengths of signals received from different base stations; and each of the base stations are configured to transmit a broadcast using the same carrier frequency in different time slots of successive frames.

15. A method of facilitating measurement of a transmission level in a radio system which includes at least one base station and terminal equipment, the method comprising:

transmitting, by at least one base station, a broadcast in different time slots of successive frames;

measuring and comparing strengths of signals transmitted by each base station by monitoring the time slots in the frames; and determining a candidate for a new base station in handover based on the monitoring.

16. A radio system which includes at least one base station and terminal equipment, wherein:

at least one base station is arranged to broadcast in different time slots of successive frames;

the terminal equipment is arranged to measure and compare strengths of signals transmitted by each base station by monitoring the time slots in the frames; and the terminal equipment is arranged to determine a candidate for a new base station in handover based on the monitoring.

* * * * *